United States Patent
Van Dore et al.

(10) Patent No.: US 9,556,614 B2
(45) Date of Patent: Jan. 31, 2017

(54) MOUNTING APPARATUS FOR SUSPENDED CEILING SYSTEM

(71) Applicant: ARMSTRONG WORLD INDUSTRIES, INC., Lancaster, PA (US)

(72) Inventors: Jonathan P. Van Dore, Lititz, PA (US); Ryan D. Hanuschak, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 0 days.

(21) Appl. No.: 14/710,731

(22) Filed: May 13, 2015

(65) Prior Publication Data

US 2016/0333581 A1    Nov. 17, 2016

(51) Int. Cl.
*E04B 9/04*  (2006.01)
*E04B 9/10*  (2006.01)
(Continued)

(52) U.S. Cl.
CPC ............... *E04B 9/10* (2013.01); *E04B 9/0478* (2013.01); *E04B 9/06* (2013.01); *E04B 9/18* (2013.01);
(Continued)

(58) Field of Classification Search
CPC ............ E04B 9/20; E04B 9/0407; E04B 9/18; E04B 9/34; E04B 9/0478; E04B 9/06; E04B 9/10
(Continued)

(56) References Cited

U.S. PATENT DOCUMENTS 394,680 A * 12/1888 Dawes ...................... F21S 8/06
                                                     248/326
651,637 A *  6/1900 Nicol ..................... F16B 21/088
                                                     24/128
(Continued)

FOREIGN PATENT DOCUMENTS

DE          8716482        7/1988
JP        06294176 A  *  10/1994
(Continued)

OTHER PUBLICATIONS

Griplock Systems 10Z-832i, Aug. 25, 2014.*
(Continued)

*Primary Examiner* — Babajide Demuren
(74) *Attorney, Agent, or Firm* — Craig M. Sterner

(57) ABSTRACT

A suspended ceiling system in one embodiment includes a ceiling panel and a mounting assembly. The mounting assembly includes a cable secured to a building support structure, a first coupler for attachment to the cable, and a second coupler for attachment to the ceiling panel. The first coupler includes a cable mounting channel having first and second openings and a cable adjustment mechanism for releasably gripping the cable. In one implementation, the adjustment mechanism includes a spring-biased plunger configured to engage the cable. The cable is routed through the channel from the first to second opening. The position of the cable with respect to the first coupler may be adjusted to select the desired position and angular orientation of the ceiling panel. In one embodiment, the first coupler includes ball element pivotably engaged with the second coupler to accommodate various angular positions of the panel and/or panel configurations.

20 Claims, 5 Drawing Sheets

(51) Int. Cl.
    *E04B 9/06*     (2006.01)
    *E04B 9/18*     (2006.01)
    *E04B 9/34*     (2006.01)
    *E04B 9/20*     (2006.01)

(52) U.S. Cl.
    CPC . *E04B 9/20* (2013.01); *E04B 9/34* (2013.01); *E04B 9/0407* (2013.01)

(58) Field of Classification Search
    USPC ........ 52/506.06, 506.05, 511, 126.1, 22, 39; 403/70, 71, 76; 248/181.1, 288.31, 481, 248/482, 483, 484
    See application file for complete search history.

(56) References Cited

U.S. PATENT DOCUMENTS

| | | | | |
|---|---|---|---|---|
| 1,137,906 | A * | 5/1915 | Rosenberg | F21S 8/06 174/62 |
| 2,323,624 | A * | 7/1943 | Schall | A63B 69/205 403/53 |
| 2,608,857 | A * | 9/1952 | La Torre | G01N 3/04 264/261 |
| 2,762,598 | A * | 9/1956 | Runge | F21V 21/112 248/327 |
| 7,947,615 | B2 | 5/2011 | Springer et al. | |
| 8,413,398 | B1 | 4/2013 | Allred et al. | |
| 2003/0205016 | A1 * | 11/2003 | Gulbrandsen | E04B 9/00 52/506.06 |
| 2006/0255226 | A1 * | 11/2006 | Frampton | F04D 25/088 248/343 |
| 2011/0121152 | A1 | 5/2011 | Ghatikar | |
| 2011/0203747 | A1 | 8/2011 | Chen et al. | |
| 2011/0214379 | A1 | 9/2011 | Norton et al. | |
| 2013/0219669 | A1 * | 8/2013 | Lin | F16G 11/108 24/115 H |

FOREIGN PATENT DOCUMENTS

| | | |
|---|---|---|
| JP | 06294177 A * | 10/1994 |
| WO | 2006108001 | 10/2006 |

OTHER PUBLICATIONS

Rigging & Tradeshow Applications, marketing materials for Grip Lock Systems. www.griplocksystems.com. 2014. US.

Griplock Grippers, marketing materials for Grip Lock Systems. Home Rigging Products. www.griplocksystems.com. Dec. 17, 2014. US.

Griplock Grippers, marketing materials for Griplock Systems, Inc., How It Works, Technical and Quality Control. www.griplocksystems.com/technicallegal/technical.cfm. Dec. 17, 2014. US.

International Search Report for corresponding Application No. PCT/US2016/031975, mailed Aug. 18, 2016. WO.

* cited by examiner

MOUNTING APPARATUS FOR SUSPENDED CEILING SYSTEM

BACKGROUND

The present invention relates to ceiling systems and more particularly to hardware mounting assemblies for a suspended ceiling system.

Suspended ceiling systems may comprise various types and shapes of ornamental and acoustical elements which are hung from an overhead support structure. These elements, referred to collectively herein as "ceiling panels," are typically attached to the support structure via mounting hardware which generally includes wires or cables and coupling mechanisms for both fastening the wires or cables to the ceiling panels at one end and to the support structure at the other end. The ability to easily adjust the position and orientation of the ceiling panels in the field during installation is desired for both creating different visual effects and accommodating varying installation conditions encountered. In addition, it is desired to easily mount numerous different shapes or geometric configurations of ceiling panels using common mounting hardware.

BRIEF SUMMARY

The present invention provides a ceiling system comprising articulating ceiling panel mounting assemblies which are readily adaptable to different panel types and configurations. In one embodiment, the mounting assemblies include a ball element which pivotally mounts the panel to a building support structure. The mounting assemblies automatically maintain a vertical orientation regardless of the angular orientation of or shape of the panel surfaces. The system provides ready adjustment of both the height and angular orientation of the ceiling panels in the field without the use of tools.

In one embodiment, a suspended ceiling system includes: a ceiling panel comprising a first major surface, a second major surface, and at least one through-hole extending from the first major surface to the second major surface; and at least one mounting assembly supporting the ceiling panel in a suspended manner within a space from a support structure. The mounting assembly includes: a cable having a first end coupled to the support structure; a first coupler comprising a ball socket and a socket aperture forming a passageway into the ball socket, the first coupler disposed in the through-hole and coupled to the ceiling panel; a second coupler comprising a ball element, a lug extending from the ball element, and a cable mounting channel in the lug extending from a first opening to a second opening; the ball element pivotably retained within the ball socket, the lug extending from the socket aperture of the first coupler so that both of the first and second openings of the cable mounting channel are located in a portion of the lug that protrudes from the second major surface of the ceiling panel; and the cable extending through the cable mounting channel of the second coupler and secured to the lug, a second end of the cable protruding from the second opening of the cable mounting channel.

In another embodiment, a suspended ceiling system includes: a ceiling panel comprising a top major surface and a bottom major surface; and at least one mounting assembly supporting the ceiling panel in a suspended manner within a space from a support structure, the mounting assembly defining a vertical mounting axis. The mounting assembly includes: a cable having a first end portion coupled to the support structure; a first coupler attached to the ceiling panel and comprising a ball socket; a second coupler attached to the cable, the second coupler comprising an elongated lug and a ball element affixed to the lug, the ball element including an at least partially spherical enlarged head pivotably mounted in the ball socket and having a solid structure; and a cable mounting channel in the lug extending from a first opening to a second opening each disposed in the lug, the cable entering the first opening, extending through the cable mounting channel, and exiting the second opening above the top major surface of the ceiling panel.

In another embodiment, a suspended ceiling system includes: a ceiling panel comprising a top major surface and a bottom major surface; and at least one mounting assembly supporting the ceiling panel in a suspended manner within a space from a support structure, the mounting assembly defining a vertical mounting axis. The mounting assembly includes: a cable having a first end portion coupled to the support structure; a first coupler attached to the ceiling panel and comprising a ball socket; a second coupler attached to the cable, the second coupler comprising an elongated lug, a ball element affixed to the lug, and a spring-biased plunger movably disposed in the cable mounting channel of the lug, the plunger configured to lockingly retain the cable in a first position and to release the cable in a second position; the ball element including an at least partially spherical head pivotably mounted in the ball socket and having a solid structure; and a cable mounting channel in the lug extending from a first opening to a second opening each disposed in the lug, the cable extending through the plunger and channel from the first opening to the second opening; wherein the cable is routed through the channel in a path that bypasses the ball element.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Figure 1:
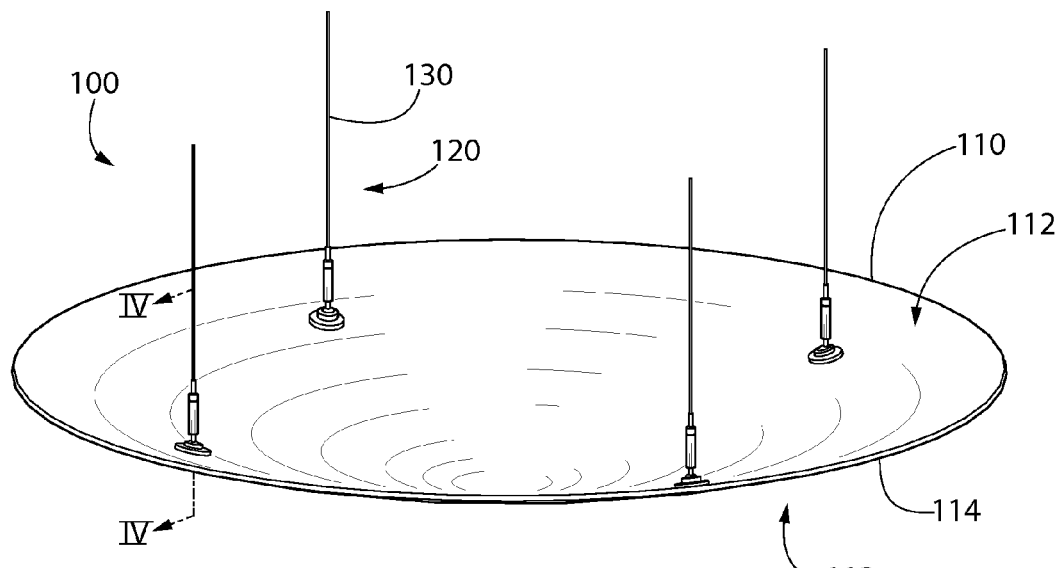
FIG. 1 is a perspective view of a ceiling according to the present disclosure including a mounting assembly.

All drawings are schematic and not necessarily to scale.

DETAILED DESCRIPTION

The following description of the preferred embodiment(s) is merely exemplary in nature and is in no way intended to limit the invention, its application, or uses.

In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges presented herein are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

A ceiling system 100 according to the present disclosure is shown in FIGS. 1-4. The system includes a ceiling panel 110 and a plurality of mounting assemblies 120 supporting the ceiling panel in a suspended manner within a space from a support structure 102. Ceiling panel 110 includes a top major surface 112, a bottom major surface 113, and a peripheral edge 114 extending therebetween.

Ceiling panel 110 may have any configuration or shape including polygonal (e.g. rectilinear, triangular, hexagonal, etc.) and non-polygonal shapes (e.g. circular, ellipsoidal, oblong, oval, curved rectangle, curved square, etc.). The ceiling panels may have surfaces with various contours including without limitation a planar surface contour or non-planar contours with varying convex, concave, angled, dished, rounded, undulating, or other type surfaces and combinations thereof. In various embodiments, the top and bottom major surfaces 112, 113 may be parallel to each other or non-parallel in orientation. In one non-limiting exemplary embodiment, ceiling panel 110 may have a dished circular shape such as the accent "cloud" shown in FIG. 1. The shape and contour of the ceiling panel does not limit the invention.

Ceiling panels 110 may be made of any suitable material with appropriate fire class rating. Exemplary materials include without limitation plastics, wood, metal, composites, laminates, fiberglass, mineral wool, etc. Ceiling panels 110 may be acoustical tiles or decorative/ornamental elements and combinations thereof. In a certain embodiment, ceiling panel 110 may be formed of polycarbonate.

Referring to FIGS. 2-5, each mounting assembly 120 defines a respective vertical mounting axis VA and includes a flexible support element such as cable 130, a cable coupler 160 attached to the cable, and a ceiling panel coupler 140 attached to the cable coupler and ceiling panel 110. In other possible embodiments, however, a rigid or semi-rigid support element may be provided. Cable 130 may be secured to the support structure 102 via any suitable type surface mount 104 depending on the nature of the support structure. Surface mount 104 is configured to fixedly attach the cable thereto. Cable 130 may be made of any suitable material selected to support the weight of the ceiling panel 110. Cables that may be used include braided, twisted, straight, or wound metallic or non-metallic wire or strand type cables comprised of multiple wires or strands. Suitable metallic cables include without limitation those formed of steel, aluminum, Inconel, or other type wires or strands. Suitable non-metallic cables include without limitation those formed of polymeric strands.

Any suitable number of mounting assemblies 120 to support the weight and/or provide the desired angular orientation of ceiling panel 110 if used. At least one mounting assembly 120 supporting the ceiling panel in a suspended manner within a space from support structure 102 is provided.

The ceiling panel coupler 140 includes an upper section 141 and a lower section 142 separable from the upper section. The upper and lower sections 141, 142 are coupled together through a mounting through-hole 111 in ceiling panel 110. In one non-limiting embodiment, the upper and lower sections may preferably be rotatably coupled together by a rotary coupling mechanism such as a threaded connection or other type rotary coupling. In some embodiments, the upper and lower sections may be linearly and slideably coupled together such as via a snap fit, fasteners, or other method capable of producing a secure mechanical interlock. Accordingly, the invention is not limited by the type of coupling mechanism used.

Upper section 141 of the ceiling panel coupler 140 may have a generally hollow tubular body including a top end 145, bottom end 146, and cylindrical sidewall 144 extending axially along vertical mounting axis VA therebetween. Sidewall 144 defines an open ball socket 147 extending between the ends. Top end 145 includes a centered upper aperture 148 which communicates with the ball socket 147 forming a socket opening. In one embodiment, upper aperture 148 may be defined by a frustoconically-shaped annular wall 150 disposed at the top end 145 and which protrudes radially inward into ball socket 147. Wall 150 partially closes the top end of the upper section 141 (best shown in FIG. 4). The obliquely angled surfaces of wall 150 increase the possible pivotable range of motion of ball element 181. In other embodiments, annular wall 150 may have straight parallel walls but still project into the ball socket to partially close the top end.

Bottom end 146 also includes a centered lower aperture 149 which communicates with the ball socket. Each of the apertures 148, 149 is concentrically aligned with the mounting axis VA. In one embodiment, the diameter of the upper aperture 148 is smaller than the lower aperture 149. The lower aperture 149 has a diameter sized to permit a ball element 181 of the pivot member 180 to pass through for insertion into the ball socket 147. The upper aperture 148 may be sized to prevent ball element 181 from passing through. Accordingly, ball element 181 may only be inserted into the ball socket 147 through the bottom end 146 of the cable coupler in one non-limiting implementation.

Upper section 141 further includes an annular flange 151 protruding radially outwards from sidewall 144. Flange 151 is a non-load-bearing structural element in one embodiment. Flange 151 may be located between the ends such as approximately midway between top and bottom ends 145, 146. In other arrangements, flange 151 may be disposed proximate to or at the top or bottom ends. Flange 151 has a diameter larger than the cylindrical sidewall 144 and the diameter of mounting through-hole 111 in the ceiling panel 110 so that upper section 141 cannot pass through the through-hole. Flange 151 therefore supports the ceiling panel coupler 140 from the ceiling panel during the mounting hardware process for convenience. The sidewall 144 may have a diameter slightly smaller than the through-hole 111 thereby allowing any part of the sidewall below the flange 151 to pass through the through-hole. In other embodiments contemplated, flange 151 may be omitted forming an axially straight and uninterrupted sidewall 141.

Figure 4:
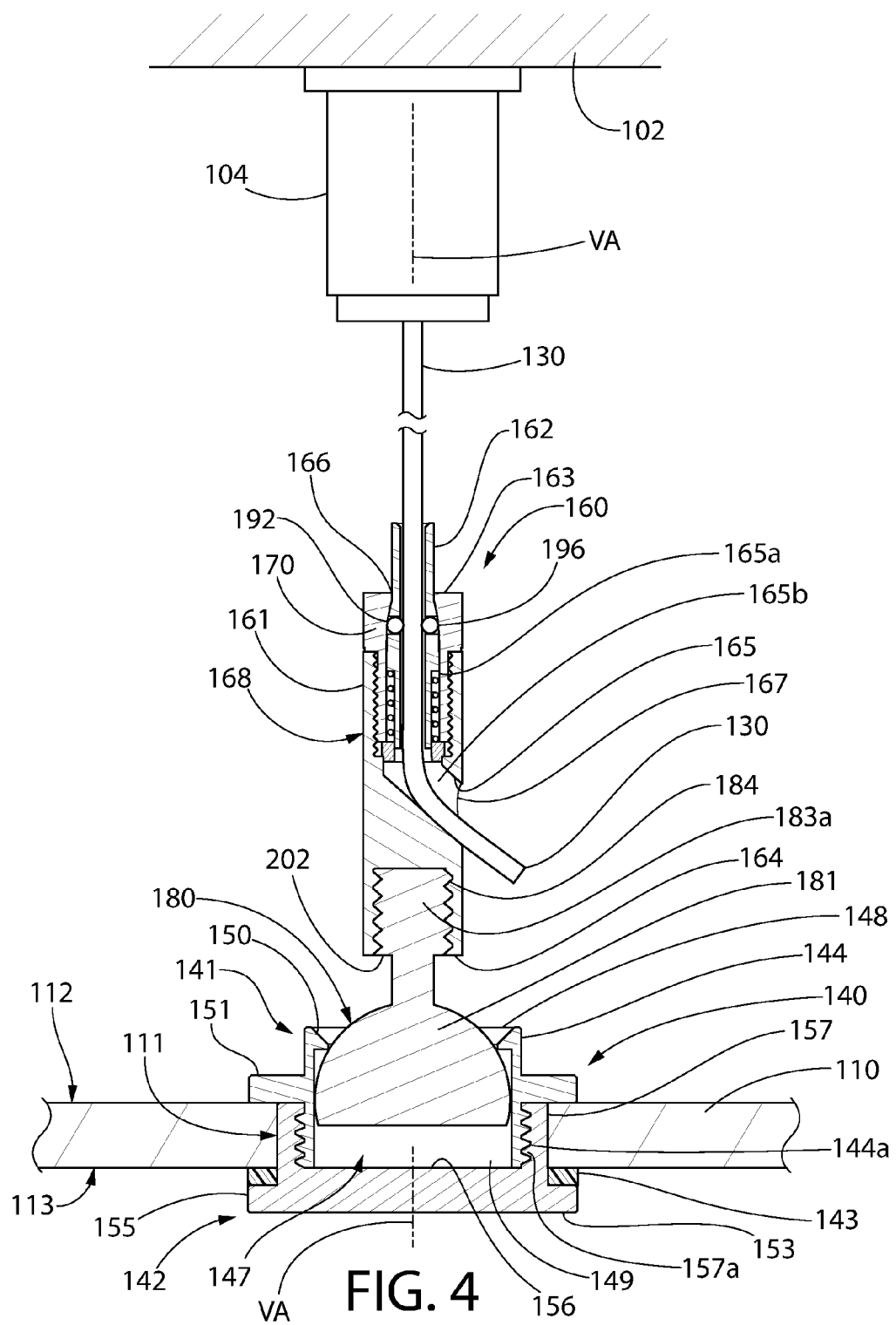
FIG. 4 is a side cross-sectional installed view of the mounting assembly supporting the ceiling panel of FIG. 1.

In one embodiment, the sidewall 144 of the ceiling panel coupler upper section 141 may include an externally threaded portion 144a for rotatably engaging a complementary configured mating internally threaded portion 157a of lower section 142 of the ceiling panel coupler 140 (see, e.g. FIG. 4). In one arrangement, threaded portion 144a may be disposed on the sidewall 144 below the flange 151 as shown.

With continuing reference to FIGS. 2-5, the lower section 142 of the ceiling panel coupler 140 may have a generally hollow tubular body including a top end 152, bottom end 153, and cylindrical sidewall 157 extending axially along vertical mounting axis VA therebetween. Sidewall 157 defines an upwardly open receptacle 156 extending between the ends. Receptacle 156 may have a closed bottom formed by a solid horizontal wall defined by the bottom end 153 of the lower section 142 which may be closed (best shown in FIG. 4). Top end 152 includes a centered upper aperture 154 which communicates with the receptacle 156. Upper aperture 154 has a diameter selected to allow the threaded portion 144a on sidewall 144 of the upper section 141 to be axially inserted at least partially into receptacle 156. Within receptacle 156, the sidewall 157 defines an internally threaded wall portion 157a to threadably engage the upper section 141, thereby coupling the upper and lower sections 141, 142 of the ceiling panel coupler 140 together.

Lower section 142 further includes an annular flange 155 protruding radially outwards from sidewall 157. Flange 155 may be located between the ends or disposed proximate to or at the top or bottom ends 152, 153. In one non-limiting arrangement as shown, flange 155 is disposed at and substantially flush with the bottom end 153 of the lower section. Flange 155 has a diameter larger than the cylindrical sidewall 157 and the diameter of mounting through-hole 111 in the ceiling panel 110 so that lower section 142 cannot pass through the through-hole. The sidewall 157 of lower section 142 may have a diameter slightly smaller than the through-hole 111 thereby allowing any part of the sidewall above the flange 155 to pass through the through-hole.

It bears noting that annular flange 155 of the lower section 142 of the ceiling panel coupler 140 is a load-bearing structural element which supports at least in part the weight of the ceiling panel 110. Conversely, annular flange 151 of the upper section 141 is essentially a non-load-bearing structural element but assists with snugly securing the ceiling panel coupler 140 to the ceiling panel 110 to minimize looseness or excessive play.

When the upper and lower sections 141, 142 of the ceiling panel coupler 140 are rotated and threadably fastened together through mounting through-hole 111 of the ceiling panel 110 as shown in FIG. 4, flange 151 of the upper section engages the top surface 113 of the ceiling panel. Flange 155 of the lower section 142 engages the bottom surface 113 of the ceiling panel. The ceiling panel 110 is therefore sandwiched and trapped between the flanges 151, 155 providing a secure and tight mount. Both sidewalls 144 and 157 of the upper and lower sections 141, 142 respectively extend through the ceiling panel as shown and are mutually engaged at least partially or completely within the ceiling panel between the flanges 151 and 155. In one embodiment, a resilient annular washer 143 may be disposed on sidewall 157 between flange 155 and the ceiling panel 110 to enhance the security of the mounting and avoid damaging the bottom surface 113 of the ceiling panel which is visible to room occupants. In some embodiments, a similar washer 143 may optionally be provided between flange 151 of the upper section 141 and the ceiling panel.

Referring to FIGS. 2-5, the cable coupler 160 generally includes an elongated cable lug 161, a spring-loaded plunger 162 supported by the lug, and pivot member 180 which in one embodiment may comprise a ball element 181 as further described herein. In one configuration, lug 160 may have a partially hollow cylindrical body comprising a circumferentially extending sidewall 168, a distal or top end surface 163, a proximal or bottom end surface 164, and an open cable mounting channel 165 extending at least partially for a distance therebetween. The proximal and distal ends of the lug 161 are defined with respect to proximity to the ceiling panel 110.

Channel 165 extends from a distal top opening 166 to a proximal lateral opening 167 in the lug 161. In one embodiment, opening 166 is formed in and penetrates the top end surface 163 and opening 167 may be formed in and penetrates sidewall 168 of the lug 161. Opening 166 may be concentrically aligned with mounting axis VA. Channel 165 may have a compound shape including axially oriented upper portion 165a and an angled lower portion 165b obliquely angled with respect to the mounting axis VA of the mounting assembly 120, which also defines a coinciding lug axis. Lower portion 165b may be oriented at any suitable angle between 0 and 90 degrees, and preferably in some non-limiting embodiments between and including 30 to 75 degrees. Other angles however may be used. The angled lower portion 165b facilitates threading cable 130 through the lug.

In one embodiment, top opening 166 of lug 161 may be formed in a separable threaded bushing 170 coupled to the lug. Bushing 170 includes a head 171 and externally threaded stem 172 extending downwards from the head and forming a shoulder therebetween. The upper portion 165a of channel 165 may be threaded to rotatably engage the bushing through an open distal or top end 174 of lug 161. In some embodiments, head 171 may be shaped as a hex head for engaging a tool to facilitate fastening the bushing 170 to the lug 161.

Bushing 170 defines an axial through-passage 173 extending between and penetrating top end 175 and bottom end 176. Through-passage 173 is concentrically aligned with and parallel to mounting axis VA. The upper portion of through-passage 173 may be tapered and angled inwards to retain plunger 162. The tapered portion 173a has a smaller diameter than the diameter of the lower straight portion 173b of the through-passage 173 for reasons presented elsewhere herein. The circumferential walls of tapered portion 173a gradually converge inwards towards distal top aperture 166 approximating a frustoconical section whereas the walls of the straight portion 173b are generally parallel.

Referring to FIGS. 2-5, the plunger assembly includes plunger 162, helical compression spring 190, annular spring retainer 191, and ball bearings 192. Plunger 162 may have a generally hollow tubular body including a top end 194, bottom end 195, and cylindrical sidewall 198 extending axially along vertical centerline Vc therebetween. Top and bottom openings 199, 200 are formed in top and bottom ends 194, 195 respectively. An internal axial conduit 193 is formed completely through the plunger 162 from top opening 199 to bottom opening 200 for receiving cable 130. Conduit 193 allows cable 130 to be threaded through the plunger 162. The ball bearings 192 are disposed inside conduit 193 and engage cable 130.

In one implementation, plunger 162 includes a diametrically enlarged tapered section 197 which defines an annular shoulder 201. Shoulder 201 provides a seat for engaging an upper end of spring 190. The other lower end of spring 190 engages the spring retainer 191 which is supported by and mounted in lug 161 within cable channel 165. Using this arrangement, spring 190 biases the plunger 162 upwards with respect to the lug 161. Tapered section 197 has a larger diameter than the distal top opening 166 of lug 161 to prevent the spring from ejecting the plunger 162 from axial through-passage 173 of the bushing 170.

Ball bearings 192 may each be mounted in a complementary configured lateral hole 196 formed completely through the cylindrical sidewall 198 of plunger 162. The outer side of each ball bearing 192 engages the interior surface of bushing 179 in the through-passage 173 and the inner side engages the cable 130 through the internal conduit 193 of the plunger 162. In operation, the tapered portion 173a of bushing 170 applies a transverse force directed radially inwards on each ball bearing 192 towards the cable 130. Each of the ball bearings 192 forcibly engage and compress the cable 130 between them to firmly grip and prevent axial slippage of the cable in the cable mounting channel 165 of the lug 161, thereby locking the cable in position with respect to lug.

Figure 5:
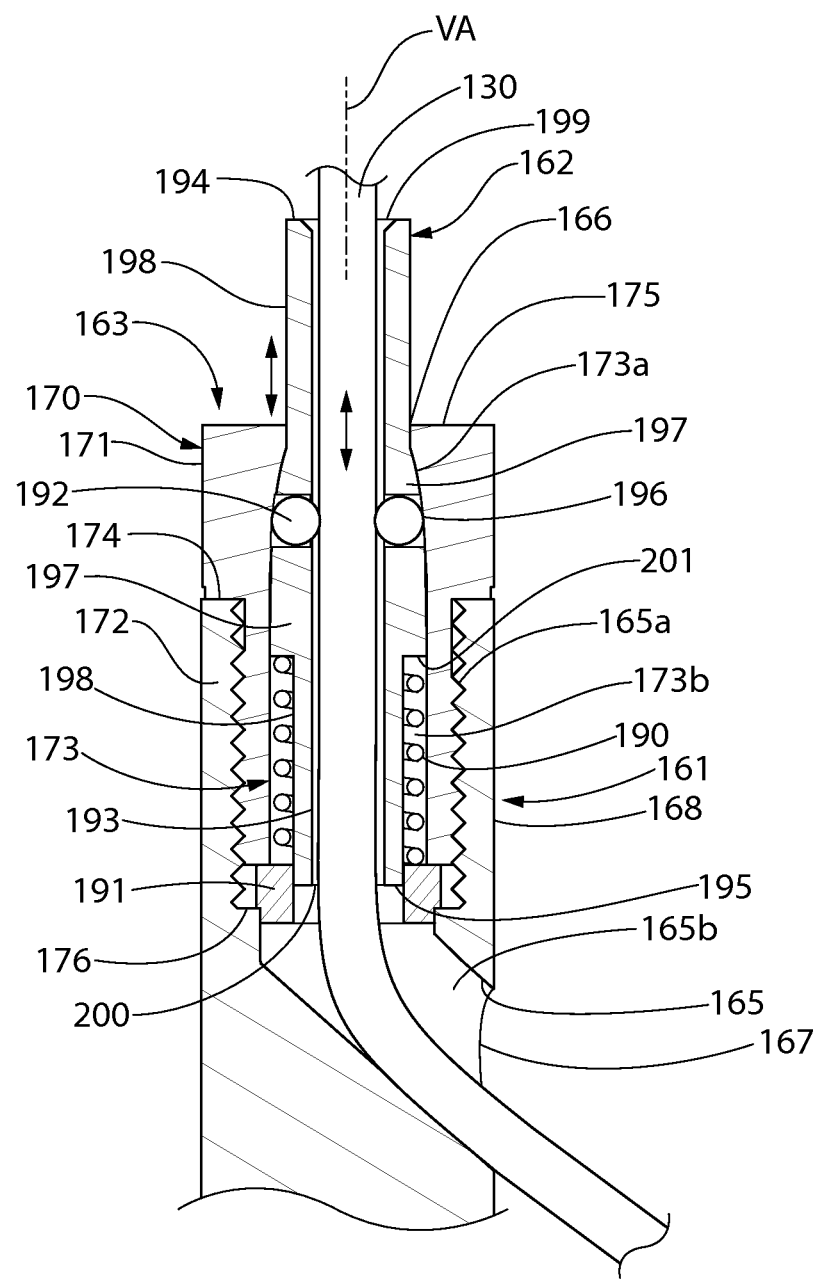
FIG. 5 is a close-up view of a portion of the mounting assembly of FIG. 4 showing greater detail.

Referring to FIG. 5, plunger 162 is therefore axially movable between an upper locked position and a lower unlocked position. The unlocked position may be obtained by pressing the plunger 162 downwards in the lug 161 against the upward biasing force of the spring 190. The ball bearings 192 leave the smaller diameter upper tapered portion 173a of the axial through-passage 173 in bushing 170 and enter the lower larger diameter straight portion 173b. The transverse force on the ball bearings 190 is reduced to the point where lateral play of the bearings is created in the bearing lateral mounting holes 196. The cable 130 is therefore loosened so that the axial position of the cable 130 with respect to the lug 161 may be adjusted. This allows the position of ceiling panel 110 (i.e. height and/or angular orientation) to be adjusted as desired. When the intended ceiling panel position is reached, the plunger 162 may be released. The spring 190 automatically returns the plunger upwards into the tapered portion 173a of the axial through-passage 173 again, thereby relocking the cable 130 in the selected axial position.

Figure 2:
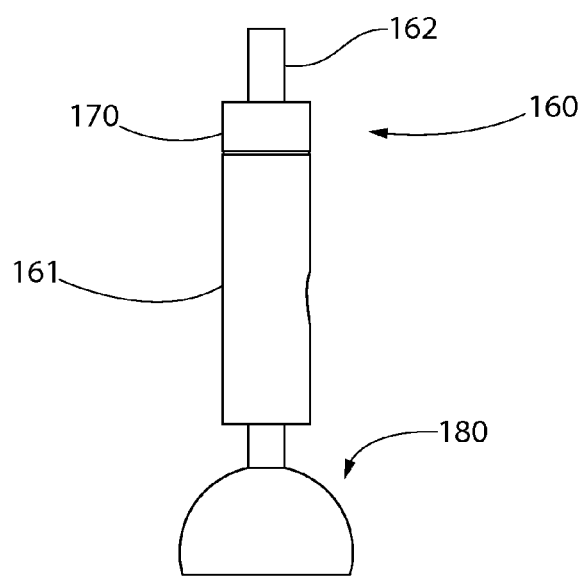
FIG. 2 is a side view of the upper portion of the mounting assembly shown in FIG. 1.
Figure 3:
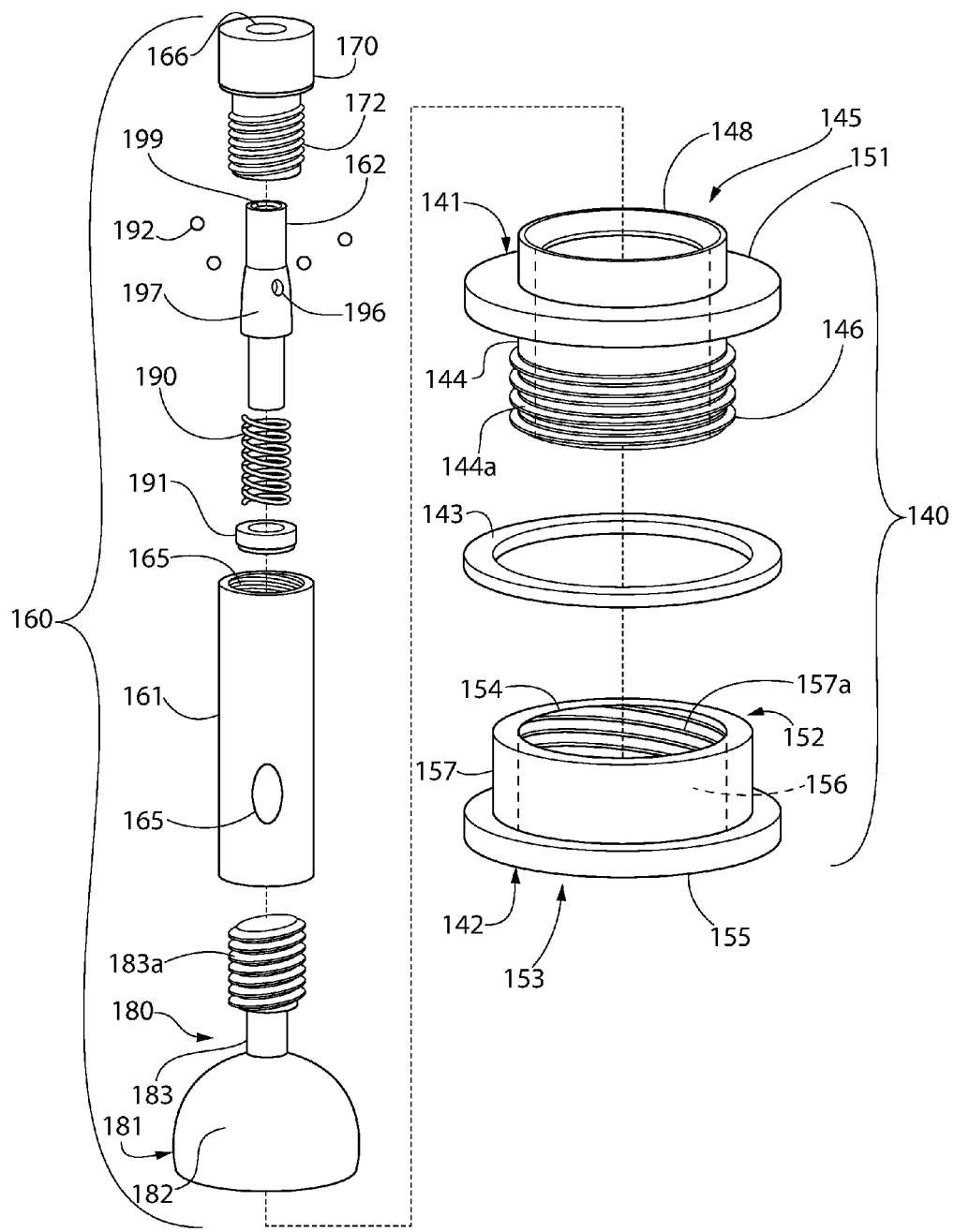
FIG. 3 is an exploded view thereof and the lower ball-socket portion of the mounting assembly of FIG. 1.

Referring to FIGS. 2-4, the pivot member 180 comprises ball element 181 which may be mounted to the proximal or bottom end 202 of lug 161. In one embodiment, ball element 181 comprises a semi-spherical head 182 and mounting stem 183 extending upwards therefrom. Ball element 181 may be mounted to lug 161 by any suitable method. In one implementation, stem 183 may have a threaded terminal end 183a engaged with a complementary configured threaded socket 184 disposed in the bottom end 202 of the lug to detachably couple the ball element thereto. In other embodiments, ball element 181 may be permanently attached to lug 161 such as via welding, soldering, adhesives, or being integrally formed as a unitary structural part of the lug.

In the assembled position, stem 183 (whether detachably or permanently affixed to lug 161) axially spaces the head 182 apart from the larger diameter bottom end 202 of lug, thereby avoiding interference with the ceiling panel coupling 140 when the ball element 181 is pivotably moved with respect to coupling 140. Accordingly, the lug 161 does not directly contact or engage the ceiling panel coupling 140. It further bears noting that no portion of the cable 130 is disposed in or engages the semi-spherical head 182 of the ball element 181. Cable 130 only passes through the cable mounting channel 165 of the cable lug 161 as shown herein.

Although head 182 of the ball element 181 has an at least partially spherical shape as shown, the head 182 may have other configurations selected to provide pivotable movement of the ball element 181. In some embodiments, head 182 may have a complete spherical shape in lieu of the half-sphere shown herein. Head 182 may be a completely solid structure for strength as shown in the exemplary embodiment because the ball element does not interact directly with the cable 130 in any manner for mounting and supporting the ceiling panel 110. In other possible embodiments, the ball element head 182 may be partially hollow to reduce weight and/or material costs.

Ceiling panels 110 may be mounted at any height and angular orientation with respect to the vertical mounting axis VA of the mounting assemblies 120. FIG. 1 shows the ceiling panel mounted in a substantially horizontal position. In other arrangements, the ceiling panel 110 may be obliquely angled with respect to mounting axis VA by shortening one or more cables 130 using the adjustable cable coupler 160 and method described above.

The ceiling panels 110 may be attached to the mounting assemblies 120 and hung from the building support structure 102 in the following manner with reference to FIG. 4. The upper section 141 of ceiling panel coupler 140 and ball element 181 may be pre-mounted to lug 161. In various embodiments, the cable coupler 160 may be attached to cable 130 either before or after mounting the cable to the support structure 102 via surface mount 104 using the spring-loaded plunger 162 and lug 161 assembly as described above. With or without cable 130 mounted to the coupler 160, the lower section 142 of coupler 140 may be positioned and inserted into ceiling panel through-hole 111. While the lower section 142 is held in position in ceiling panel 110, the upper section 141 with ball element 181 emplaced therein may then be threadably engaged with the lower section 141 via a rotational motion until both sections are completely coupled together with a preferably snug engagement of the top and bottom surfaces 112, 113 of the ceiling panel. Of course in other possible mounting processes, the upper section 141 of ceiling panel coupler 140 may instead be inserted first in through-hole 111 and then threadably engaged with the lower section 142. If the cable 130 has not been fastened to cable coupler 160 yet, the cable may then be fed through the lug 161 and secured in the manner already described herein.

Once the ceiling panel 110 is attached to the cable 130 by all mounting assemblies 120 that may be provided (e.g. four for the non-limiting embodiment of FIG. 1), the height and angular orientation of the ceiling panel may be adjusted by sliding and threading more or less cable through the lug 161 using the movable plunger 162 as already described above. Because the plunger 162 may be manually operated for releasing and locking the cable, no tools are required to position the ceiling panels as desired.

Figure 6:
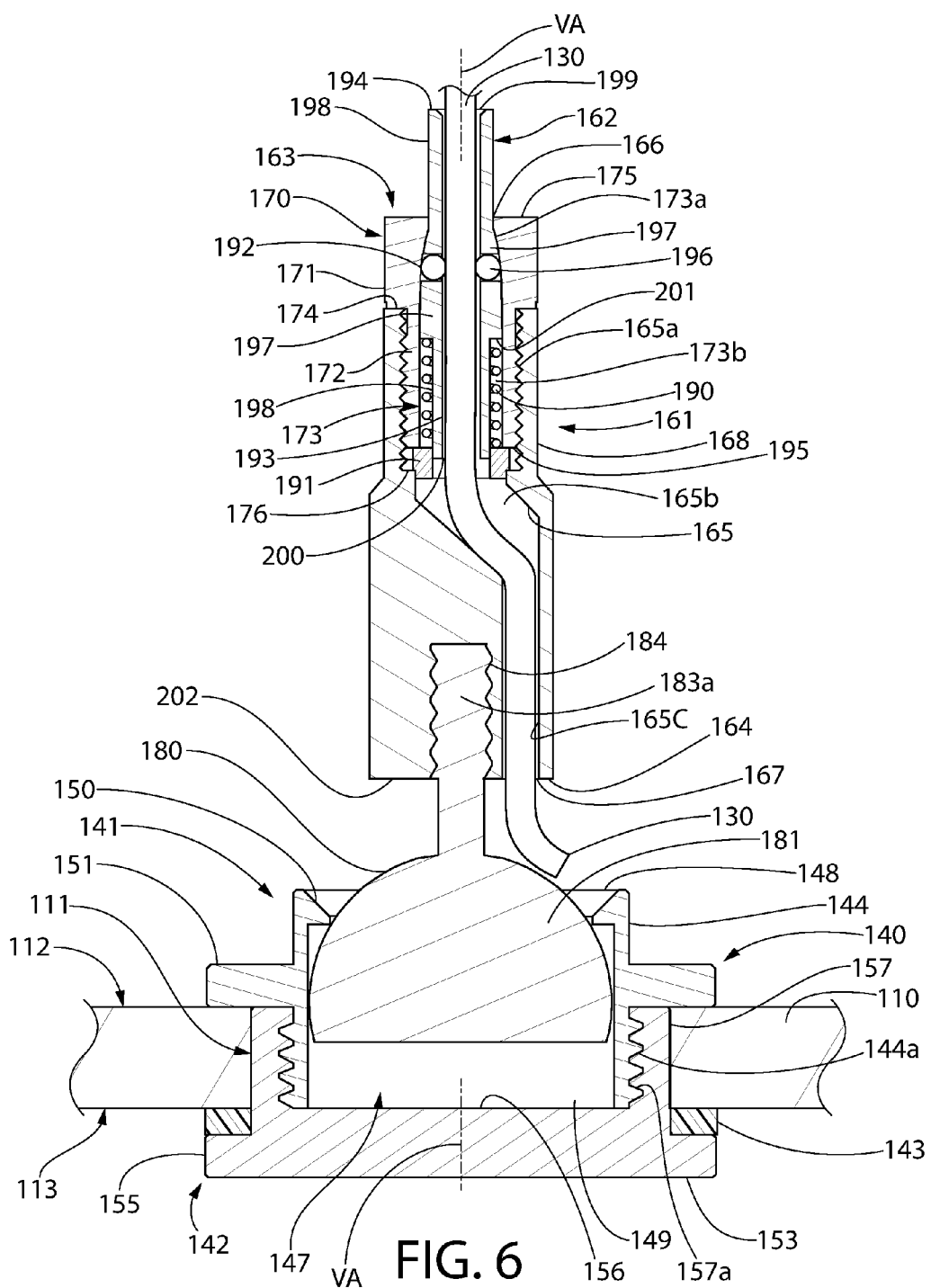
FIG. 6 is a side cross-sectional view of an alternative embodiment of a mounting assembly.

FIG. 6 shows an alternative embodiment of lug 161 having a bottom oriented cable outlet in lieu of a side exit as shown in FIGS. 4 and 5. Referring to FIG. 6, cable mounting channel 165 has an upper portion 165a concentrically aligned and parallel with the vertical mounting axis VA, an angled portion 165b, and a lower exit portion 165c arranged parallel to and laterally offset from axis VA. Angled portion 165b is obliquely oriented with respect to portions 165a and 165c. The cable exit opening 167 is relocated to the bottom surface 164 of lug 161 in a more proximate located to the top surface 112 of ceiling panel 110. This arrangement may be advantageous where it is desired to better conceal the exposed bottom tail of cable 130 from sight in the space below the ceiling panel when using certain configurations and/or orientations of ceiling panels. It bears noting that when cable 130 is routed through channel 165, the cable in either the embodiments of FIG. 4 or 6 bypasses the ball element 181.

In certain other embodiments, a non-pivotable ceiling coupling may be provided as by directly and fixedly attaching the lug 161 to the upper section 141 of the ceiling panel coupling 140. Ball socket 147 may thus be omitted, and the upper section 141 of coupling 140 and lower section 142 may otherwise be configured similarly to that shown and described above. The lug 161 may be attached upper section 141 either detachably such as via a threaded connection or permanently such as via welding or integral formation of the upper section 141 and lug. The remainder of the mounting assembly 120 and operation may be the same as already described herein. One skilled in the art would readily understand how make this adaptation without further elaboration herein.

While the foregoing description and drawings represent the exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A suspended ceiling system comprising:
   a ceiling panel comprising a first major surface, a second major surface, and at least one through-hole extending from the first major surface to the second major surface;
   at least one mounting assembly supporting the ceiling panel in a suspended manner within a space from a support structure, the mounting assembly comprising:
      a cable having a first end coupled to the support structure;
      a first coupler comprising a ball socket and a socket aperture forming a passageway into the ball socket, the first coupler disposed in the through-hole and coupled to the ceiling panel;
      a second coupler comprising a ball element, a lug affixed to and supporting the ball element, and a cable mounting channel in the lug extending from a first opening to a second opening;
      the ball element pivotably retained within the ball socket, the lug extending from the socket aperture of the first coupler so that both of the first and second openings of the cable mounting channel are located in a portion of the lug that protrudes from the second major surface of the ceiling panel; and
      the cable extending through the cable mounting channel of the second coupler and secured to the lug, a second end of the cable protruding from the second opening of the cable mounting channel;
   wherein no portion of the cable is disposed in the ball element.

2. The suspended ceiling system according to claim 1 wherein the lug extends from the ball element along a lug axis and terminates in a distal end surface, the lug having a sidewall surface extending downwardly from the distal end surface toward the ball element, the first opening of the cable mounting channel located on the distal end surface of the lug and the second opening of the cable mounting channel located on the sidewall surface.

3. The suspended ceiling system according to claim 1 wherein the lug does not engage the socket aperture of the first coupler.

4. The suspended ceiling system according to claim 1 wherein the ball element comprises an at least partially spherical head and a stem extending from the head, the stem affixed to the lug and configured such that the lug does not engage the head.

5. The suspended ceiling system according to claim 1 wherein the ball element is threadably attached to the lug.

6. The suspended ceiling system according to claim 1 wherein the cable mounting channel include a first straight portion axially aligned with the lug axis and a second angled portion obliquely angled with respect to the lug axis.

7. The suspended ceiling system according to claim 6 wherein second opening is formed in the second angled portion of the cable mounting channel.

8. The suspended ceiling system according to claim 1 further comprising a spring-biased plunger movably disposed in the cable mounting channel of the lug, the plunger configured to lockingly retain the cable in a first position and to release the cable in a second position.

9. The suspended ceiling system according to claim 1 wherein the first coupler comprises an upper section and a separable lower section coupled to the upper section through the at least one through-hole in the ceiling panel.

10. A suspended ceiling system comprising:
    a ceiling panel comprising a top major surface and a bottom major surface;
    at least one mounting assembly supporting the ceiling panel in a suspended manner within a space from a support structure, the mounting assembly defining a vertical mounting axis and comprising:
       a cable having a first end portion coupled to the support structure;
       a first coupler attached to the ceiling panel and comprising a ball socket;
       a second coupler attached to the cable, the second coupler comprising an elongated lug and a ball element affixed to and supported by the lug, the ball element including an at least partially spherical enlarged head pivotably mounted in the ball socket and having a solid structure; and
       a cable mounting channel in the lug extending from a first opening to a second opening each disposed in the lug, the cable entering the first opening, extending through the cable mounting channel, and exiting the second opening above the top major surface of the ceiling panel;
    wherein no portion of the cable is disposed in the ball element.

11. The suspended ceiling system according to claim 10 wherein the lug and the first and second openings are spaced vertically apart from the top major surface of the ceiling panel.

12. The suspended ceiling system according to claim 10 wherein the second opening of the lug is located such that the cable exits the second opening at an oblique angle to the vertical mounting axis.

13. The suspended ceiling system according to claim 12 wherein the second opening is formed in a sidewall of the lug.

14. The suspended ceiling system according to claim 13 wherein the first opening of the lug is concentrically aligned with the vertical mounting axis.

15. The suspended ceiling system according to claim 10 wherein the first coupler comprises an upper section and a separable lower section coupled to the upper section through a through-hole formed in the ceiling panel.

16. The suspended ceiling system according to claim 10 wherein the ball element includes a stem extending outwards from the head which couples the head to the stem, the head spaced apart from the lug by the stem such that the lug does not directly engage the head.

17. The suspended ceiling system according to claim 10 further comprising a spring-biased plunger movably disposed in the cable mounting channel of the lug, the plunger configured to lockingly retain the cable in a first position and to release the cable in a second position.

18. The suspended ceiling system according to claim 10 wherein the second opening is formed in a bottom surface of the lug.

19. A suspended ceiling system comprising:
a ceiling panel comprising a top major surface and a bottom major surface;
at least one mounting assembly supporting the ceiling panel in a suspended manner within a space from a support structure, the mounting assembly defining a vertical mounting axis and comprising:
a cable having a first end portion coupled to the support structure;
a first coupler attached to the ceiling panel and comprising a ball socket;
a second coupler attached to the cable the second coupler comprising an elongated lug and a ball element affixed to the lug, the ball element including an at least partially spherical enlarged head pivotable mounted in the ball socket and having a solid structure; and
a cable mounting channel in the lug extending from a first opening to a second opening each disposed in the lug, the cable entering the first opening, extending through the cable mounting channel, and exiting the second opening above the top major surface of the ceiling panel;
wherein the cable mounting channel comprises a first section concentrically aligned with the vertical mounting axis, a second section laterally offset from and parallel to the vertical mounting axis, and a middle section therebetween obliquely angled to the first and second sections; and
wherein the second opening is formed in a bottom surface of the lug.

20. A suspended ceiling system comprising:
a ceiling panel comprising a top major surface and a bottom major surface;
at least one mounting assembly supporting the ceiling panel in a suspended manner within a space from a support structure, the mounting assembly defining a vertical mounting axis and comprising:
a cable having a first end portion coupled to the support structure;
a first coupler attached to the ceiling panel and comprising a ball socket;
a second coupler attached to the cable, the second coupler comprising an elongated lug, a ball element affixed to and supported by the lug, and a spring-biased plunger movably disposed in the cable mounting channel of the lug, the plunger configured to lockingly retain the cable in a first position and to release the cable in a second position;
the ball element including an at least partially spherical head pivotably mounted in the ball socket and having a solid structure; and
a cable mounting channel in the lug extending from a first opening to a second opening each disposed in the lug, the cable extending through the plunger and channel from the first opening to the second opening;
wherein the cable is routed through the channel in a path that bypasses the ball element.

* * * * *